United States Patent
Jahn et al.

(10) Patent No.: US 7,585,169 B2
(45) Date of Patent: Sep. 8, 2009

(54) METHOD FOR PRODUCING AN ADHESIVE CLOSURE ELEMENT

(75) Inventors: Werner Jahn, Jössnitz (DE); Guntmar Seifert, Plauen (DE)

(73) Assignee: Aplix Microsystems GmbH & Co. KG, Plauen (DE)

( * ) Notice: Subject to any disclaimer, the term of this patent is extended or adjusted under 35 U.S.C. 154(b) by 845 days.

(21) Appl. No.: 10/498,741

(22) PCT Filed: Oct. 15, 2002

(86) PCT No.: PCT/DE02/03908

§ 371 (c)(1),
(2), (4) Date: Jun. 15, 2004

(87) PCT Pub. No.: WO03/051148

PCT Pub. Date: Jun. 26, 2003

(65) Prior Publication Data

US 2005/0212170 A1 Sep. 29, 2005

(30) Foreign Application Priority Data

Dec. 15, 2001 (DE) ................................ 101 61 744

(51) Int. Cl.
*B29C 43/46* (2006.01)
(52) U.S. Cl. .................. 425/362; 425/327; 425/328; 425/365; 425/471
(58) Field of Classification Search ................ 264/167; 425/362, 363, 365, 373, 327, 328, 471
See application file for complete search history.

(56) References Cited

U.S. PATENT DOCUMENTS 3,302,592 A * 2/1967 Werner ...................... 425/471

3,555,601 A * 1/1971 Price .......................... 425/327

(Continued)

FOREIGN PATENT DOCUMENTS

DE 19646318 A1 5/1998

(Continued)

*Primary Examiner*—Yogendra Gupta
*Assistant Examiner*—Emmanuel S Luk
(74) *Attorney, Agent, or Firm*—Laurence A. Greenberg; Werner H. Stemer; Ralph E. Locher

(57) ABSTRACT

The invention relates to a method for producing an adhesive closure element made of a thermoplastic synthetic material, by means of an extruder, which is produced without the need for screens, using a tempered forming cylinder (3) coated in rubber and a pressure cylinder in the form of a tempered pressure and smoothing cylinder. According to the invention, the synthetic material of a strip of film (2) is compressed by a wide split nozzle (1) of the extruder into pin holes (4) embodied as pocket holes in a rubber layer (7) which is arranged on the tempered forming cylinder (3), said layer of rubber (7) and the pin holes being provided with a teflon covering. The pin strip (5) is guided by means of a tempered withdrawal cylinder (10) between a gap with a gap with a pression cylinder (9) heated to a temperature greater than 230° C. and covered with PTFE at a low speed of between approximately 1 m/min. and 20 m/min. Alternatively, the pin heads (11) are formed by a plasma device (13) or by a plasma arc (14) produced therefrom and the strip is displaced at a speed of between 12 m/min. and 200 m/min.

5 Claims, 5 Drawing Sheets

U.S. PATENT DOCUMENTS

| | | | |
|---|---|---|---|
| 3,810,729 A * | 5/1974 | Patchell | 425/308 |
| 4,110,152 A * | 8/1978 | Dunning et al. | 156/553 |
| 4,155,693 A * | 5/1979 | Raley | 425/363 |
| 4,211,743 A * | 7/1980 | Nauta et al. | 264/284 |
| 4,682,942 A * | 7/1987 | Gotchel et al. | 425/103 |
| 4,718,338 A * | 1/1988 | Koba | 100/121 |
| 5,217,532 A * | 6/1993 | Sasame et al. | 118/60 |
| 5,234,040 A * | 8/1993 | Koba | 144/2.1 |
| 5,759,455 A * | 6/1998 | Kamitakahara et al. | 264/1.34 |
| 5,935,613 A * | 8/1999 | Benham et al. | 425/89 |
| 6,060,009 A * | 5/2000 | Welygan et al. | 264/167 |
| 6,132,660 A | 10/2000 | Kampfer | |
| 6,287,665 B1 | 9/2001 | Hammer | |
| 6,627,133 B1 | 9/2003 | Tuma | |
| 7,165,959 B2 * | 1/2007 | Humlicek et al. | 425/174.4 |
| 7,217,119 B2 * | 5/2007 | Clune et al. | 425/471 |

FOREIGN PATENT DOCUMENTS

| | | |
|---|---|---|
| DE | 19828856 C1 | 10/1999 |
| WO | 94/23610 | 10/1994 |
| WO | 94/29070 | 12/1994 |
| WO | 01/24654 A1 | 4/2001 |

* cited by examiner

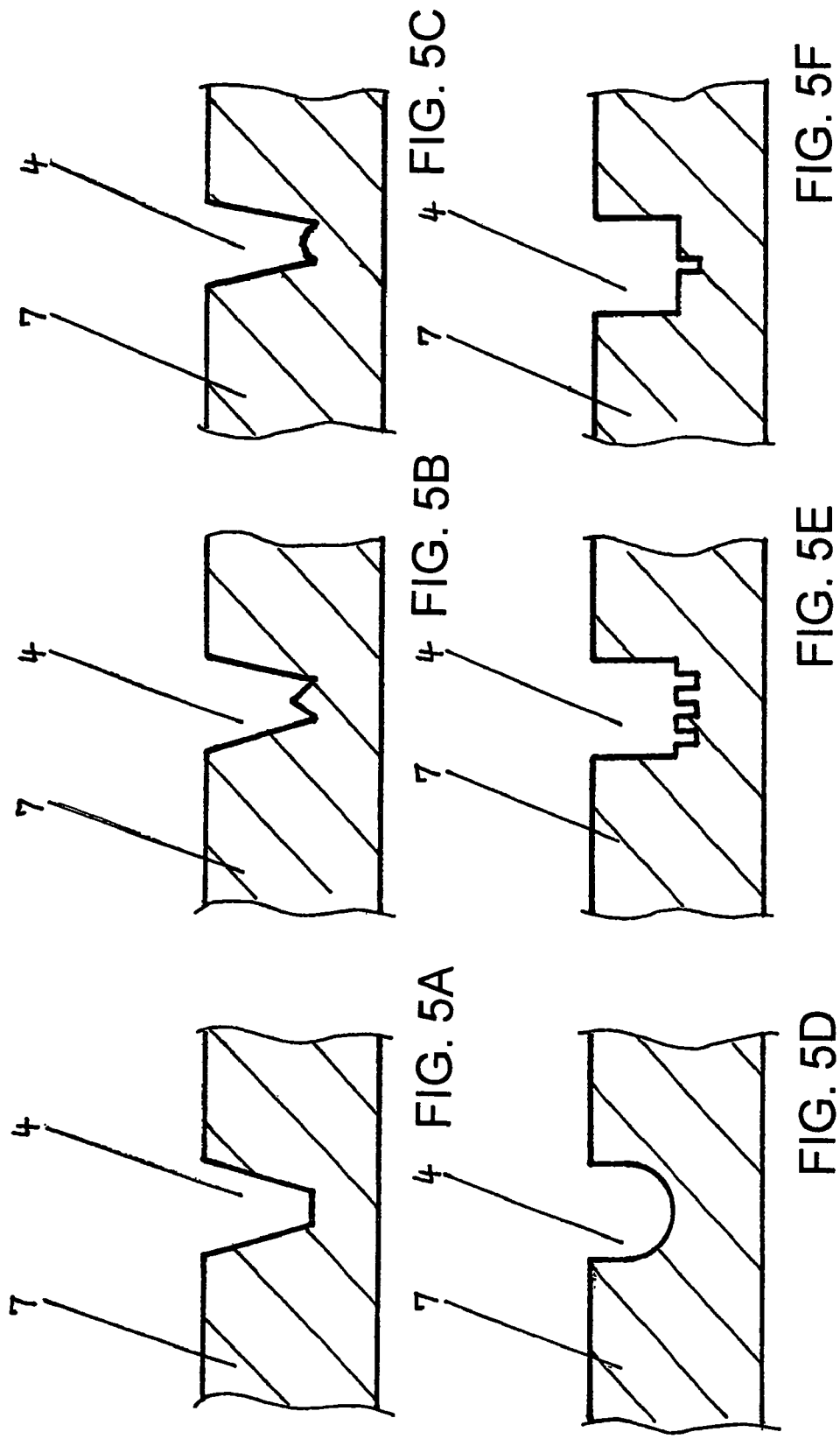

METHOD FOR PRODUCING AN ADHESIVE CLOSURE ELEMENT

BACKGROUND OF THE INVENTION

Field of the Invention

The invention relates to a method for producing an adhesive closure element, said method, without the use of screens, but employing a rubber-coated roller, being capable of producing a multiplicity of hooking means in the form of pins formed on a forming roller, a thermoplastic being fed by an extruder, via a sheet die, to the pin roller equipped with special features, and subsequently, depending on the magnitude of the production speed, either undergoing a head-forming of the pins by pressure by means of a thermally controlled pressure roller, which is already conventionally known in the production of broad films, in conjunction with a deflecting roller or, alternatively, running, free of contact, through a plasma field in which the head formation of the pins takes place. The method according to the invention is applied in the production of adhesive closure elements which are in multifarious use, preferably as fastening means with an associated counterpiece, as conventionally known touch-and-closed fastenings.

German Published, Non-Prosecuted Patent Application DE 198 28 856, corresponding to U.S. Pat. No. 6,627,133 to Tuma, has hitherto disclosed the solution of a production method for adhesive closure elements, which is characterized in that a forming die is employed, which, on that side of a screen which faces away from a pressure die, has a second forming element which cooperates with the cavities of said forming die and by which the thermoplastic material is formed in the region of the outer ends of the individual male molds. In this case, the pressure die used is a pressure roller and the forming die used is a forming roller carrying the forming elements, the two rollers being driven for a conveying nip which is formed between them and through which the carrier is moved in the transport direction. Apart from the fact that the profiling of strip material whose profile is located on it, using embossing rollers, is already sufficiently known in the prior art, the essence of the Tuma publication is that a metallic screen having a roller-like design and consisting of two screen layers arranged one above the other is produced with orifices of different size, the inner layer having larger orifices than the outer layer, but the orifices themselves being located congruently one above the other. Thermoplastic is pressed through the screen having continuous cavities and cures at least partially there, but, after the further rotation of the roller during the production process, can be drawn off again from the latter, the thicker head of the spikes being drawn through the narrower outer orifice of the screen roller, without its form being damaged at the same time.

This solution has the disadvantage, however, that it constitutes an extremely cost-intensive design on account of the complicated configuration of the metallic roller screen, which is virtually doubled, and, moreover, the process of the necessary adjustment of the separately designed roller screens requires a counterproductive additional operation, since the orifices of the two screen layers must be arranged as accurately as possible one above the other to ensure a fault-free production sequence. The cost outlay for this selected design is highly disadvantageous, if only because of the costly and complicated machining for introducing the screen orifices, preferably by means of drilling, but also by laser.

Furthermore, German Published, Non-Prosecuted Patent Application DE 196 46 318, corresponding to U.S. Pat. No. 6,287,665 to Hammer, discloses the further solution of a method; for producing an adhesive closure element from thermoplastic, said method being characterized in that a forming roller forms a screen, the cavities of which have been produced by drilling or etching or by a laser, and in that the finished hooking means of the fastening element arise solely due to the fact that the thermoplastic cures at least partially in the open cavities of the screen of the forming roller. The heads of the hooking means themselves are formed, during the production process, in a gap between the screen of the forming roller and the inner roller body. In particular, the formation of an adhesive closure for baby diapers or for hospital clothing is disclosed as a possibility for the application of adhesive closure elements produced in this way. For use in adhesive closures of articles of clothing of this type, a relatively high number of hooking means, as compared with alternative fastening means, in relation to a unit of area is required. In this already known method, this leads to very high production costs for the forming die which, correspondingly to the high number of hooking means, necessitates a screen with a correspondingly large number of cavities per $cm^2$. In order to ensure that end-face thickenings can be produced at the outer end of the spikes formed in the screen cavities by the pressed-in plastic, in the known method it is necessary, moreover, for the screen cavities to have inward-running radii at their edges, at least on the side facing away from the pressure die.

The abovementioned solution has the disadvantage, however, that the forming, necessary for this purpose, of the very large number of cavities of the screen, which may take place by drilling, etching or electroplating or by means of laser machining, also leads to very high production costs which then subsequently unfavorably have an adverse effect on the price of the adhesive closure element itself.

Finally, German Published, Non-Prosecuted Patent Application DE 694 27 164, corresponding to U.S. Pat. Nos. 6,635, 212 to Melbye et al., 6,558,602 to Melbye et al., 5,879,604 to Melbye et al., to 5,845,375 to Miller et al., 5,679,302 to Miller et al., 5,607,635 to Melbye et al., and 5,077,870 to Miller et al., also discloses a further solution of a method for producing a mushroom-shaped hooked tape for a mechanical connector by extruders, of various heated or pressure-exerting roller systems and of a vacuum unit, the hooked tape, as product, consisting of a one-piece arrangement of upstanding stalks with heads, said method being characterized in that, in a step of the continuous leadthrough of the tape, the nip through which the tape is led between two rollers, of which one roller is heated and a second counterroller exerts a pressure, has, between the supporting surface of the pressure roller and the heated surface of the heated roller, a dimension which is smaller than the predetermined initial thickness dimension of the tape, in order thereby to compress the projections against the heated surface, the speed, the nip dimension and the heat capacity of the heated roller being dimensioned such as to bring about a heat transmission from the heated surface into the compressed projections which is sufficient to deform outer portions of the projections into generally circular or disk-shaped hook heads.

This solution has the disadvantage that, on the one hand, it requires a high production outlay due, in terms of apparatus, to expensive and cost-intensive installations with a solid and a drilled roller and also to an additional vacuum system and, on the other hand, it produces a final product which is distinguished only by a relatively small number of circular or hook-shaped hook heads, with the result that a sufficiently good service value with respect to the adhesive closure is not achieved.

SUMMARY Of THE INVENTION

The invention, therefore, provides a technically efficient and also cost-effective production method, in which the method set-up necessary for this purpose can be produced at a low outlay and, ultimately, for an at least equivalent final product, production can be carried out more simply and more inexpensively than in the methods known hitherto. The goals of the invention is achieved by a method for producing an adhesive closure element from thermoplastic in the form of an extruded pin strip, on which a multiplicity of hooking measures in the form of pins with pin heads thickened at the end are disposed and which is fed from a sheet die to the nip between a thermally controlled forming roller and a likewise thermally controlled pressure and smoothing roller. A forming roller with a metallic basic body is equipped on its surface with a rubber layer that, on its circumference, has pin holes, introduced by laser treatment, as blind holes, into which a film strip is pressed by the pressure of the thermally controlled pressure and smoothing roller. As a result, pins are produced, and the pin strip is drawn off by a likewise thermally controlled draw-off roller, and, in the case of low strip running speeds of the pin strip, the heads of the pins are formed by temperature and pressure by a heated and Teflon-coated pressure roller. But, in the case of high strip running speeds of the pin strip, the pin heads are produced, without contact, by a plasma device and its plasma arc.

The essence of the invention lies in the application of a production method for an adhesive closure element which is extruded from thermoplastic as a film strip and is fed via a sheet die to the nip between a thermally controlled smoothing and pressure roller and a thermally controlled rubber-coated forming roller. In this case, for carrying out the method according to the invention, this rubber-coated forming roller is distinguished by several special structural features. The basic body of the thermally controlled forming roller is metallic and a rubber layer is applied with a form fit to this roller. In this case, after being applied to the forming roller, the rubber layer is laser-treated. By the process of the laser treatment of the rubber layer, blind holes for the subsequent reception of the pins as locking elements are introduced into the rubber layer by appropriate forming in an extremely economical way. The configuration of the pins themselves preferably takes place in the cross-sectional form of a triangle. The feature of the arrangement of blind holes for receiving the pins is decisive for the configuration of the rubber layer. The rubber layer thus lies over the full area on the basic body of the thermally controlled metallic forming roller which is expediently roughened for better reception and a secure fit of the rubber layer. Owing to the arrangement of the blind holes, the rubber layer is interrupted only on its surface and consequently also does not form a screen, in contrast to the previous prior art. In this application, rubber, as a material, can be laser-treated very efficiently or cost-effectively and extremely easily. There are also at the edges of the orifices for the pins, no obstructive domes or humps having an adverse effect. Furthermore, even a very large number of orifices per $cm^2$ can be laser-treated extremely cleanly, thus contributing to a desirably high service value of the final product. A further advantage of the rubber layer, moreover, is its relative elasticity in relation to any comparable metallic material, thus making it possible for the mold removal operation to be carried out more easily in the production process. There is, furthermore, the possibility of the multiple use even of a laser-treated rubber layer, in that the latter is overturned and laser-treated again. Moreover, already laser-treated rubber layers can easily be laser-retreated, as desired, for example if the requirement for longer pins is imposed because of another intended use of the adhesive closure. There is likewise the possibility of the quick change of such a cost-effective rubber layer, if, for example, the form of the cross section of the pins in terms of their geometry and their length or the number of pins or fastening hooks per unit area are to be changed for different intended uses. Furthermore, for example, even 700 holes per $cm^2$ can easily be introduced into the rubber layer. The number of holes per unit area can therefore be selected freely in quantity, although, beyond a specific order of magnitude, there is no longer any point in terms of the action of a good adhesive closure. Only the fact that there are no longer any method restrictions due to economic constraints is essentially in the solution according to the invention.

The choice of a thermally controlled forming roller with a rubber coating has a revolutionary effect on the relevant specialized field, since there are no longer any limits in any respect. Starting with the coating thickness of the rubber through to the forming of the shank of the pins and the form of the head of the pins and, of course, the number per unit area, there is free selectability, without restriction, in an otherwise complicated production. Thus, for example, the coating thickness of the rubber layer can expediently be selected freely in thickness from about 0.5 mm to 3.0 mm, where the most beneficial orders of magnitude are concerned. Moreover, in the case of the thermally controlled rubber-coated forming roller according to the invention, an optimum, even ideal hole geometry adapted to the intended use is possible. This lies in its slightly conical form, running continuously, that is to say uniformly downward, of the blind hole for the pins. In addition to this preferred conical variant, however, blind holes running exactly cylindrically may also be used. Commencing at the surface of the rubber layer with a slightly enlarged hole, the laser-treated hole runs downward, narrowing slightly, which, in the production process, favorably influences the mold removal operation and makes possible or allows high strip speeds.

In contrast to DE 198 28 856, in the proposed solution according to the invention, the bottom of the blind hole is subsequently machined in such a way that any desired arbitrary geometric shape through to a further depression of the originally laser-treated hole can be produced three-dimensionally by laser treatment. Thus, in addition to the above-mentioned possibilities of free three-dimensional configuration, there is, moreover, also the free selectability of the blind hole bottom for the configuration of the pin head of the subsequent hooking element.

Furthermore, the rubber layer of the thermally controlled forming roller is subjected to separate surface treatment with a PTFE Teflon coating, in order in technical terms to influence beneficially the uniform pressing in of the plastic and also the removal of the pins from the mold. In the solution according to the invention, it is not necessary for the blind holes for pin production to be vented by means of a vacuum system, since the selected geometry and the surface treatment of the rubber layer, including the blind holes, with Teflon makes it unnecessary to generate a vacuum particularly for pressing in, but also for the removal of the pins from the mold.

The thickness of the Teflon layer is dependent on the hole depth, the geometry and the number of holes per $cm^2$. It ranges in order of magnitude from preferably approximately 3 μm to approximately 5 μm. As the production process progresses, the Teflon is pressed increasingly into the walls of the holes, as a result of which the effect of increasing consolidation and smoothing can be noted. Thus, the coating material is not wasted or it does not wear away prematurely as a result of high wear, in relation to the useful life and period of use of the rubber layer of the forming roller. A tribo effect occurs in a positive way, in that the Teflon lining the walls and the bottom of the holes is pressed further into the smallest pores of the walls by the pressing-in plastic and thereby provides a surface which is increasingly consolidated, but at the same time is very smooth, with low resistance and high slidability for the penetrating plastic and its subsequent mold removal. Closely related to an improvement in the sliding pairing is a high running speed of the installation, together with an excellent quality of the products themselves.

The removal of the strip having the pins from the mold takes place by means of a draw-off rollerer which follows in the production cycle and is connected to a plasma device. The pin strip is led through between the draw-off roller and the plasma device, said pin strip being exposed, without contact, to the plasma arc and the outer ends of the plastic are fused, with the result that the heads of the hooking elements are formed. This configuration of the pin heads which is obtained in terms of apparatus and method by means of a plasma device is employed in the case of high strip running speeds in the range of about 12 m/min to approximately 200 m/min. In the lower speed range of about 1 m/min to approximately 20 m/min, head formation is carried out purely mechanically and in the conventional way, the pin strip being led through in the nip between a Teflon-coated pressure roller heated to >230° C. and a thermally controlled draw-off roller, and at the same time the pin heads being pressed down. Finally, it is merely the process of winding up the finished pin strip for transport or for further processing that is carried out.

The invention will be explained in more detail below with reference to an exemplary embodiment. In the accompanying drawings:

BRIEF DESCRIPTION OF THE DRAWINGS

FIGS. 5A to 5F are fragmentary, enlarged, cross-sectional views of different embodiments of pin holes according to the invention.

Figures 1, 1A:
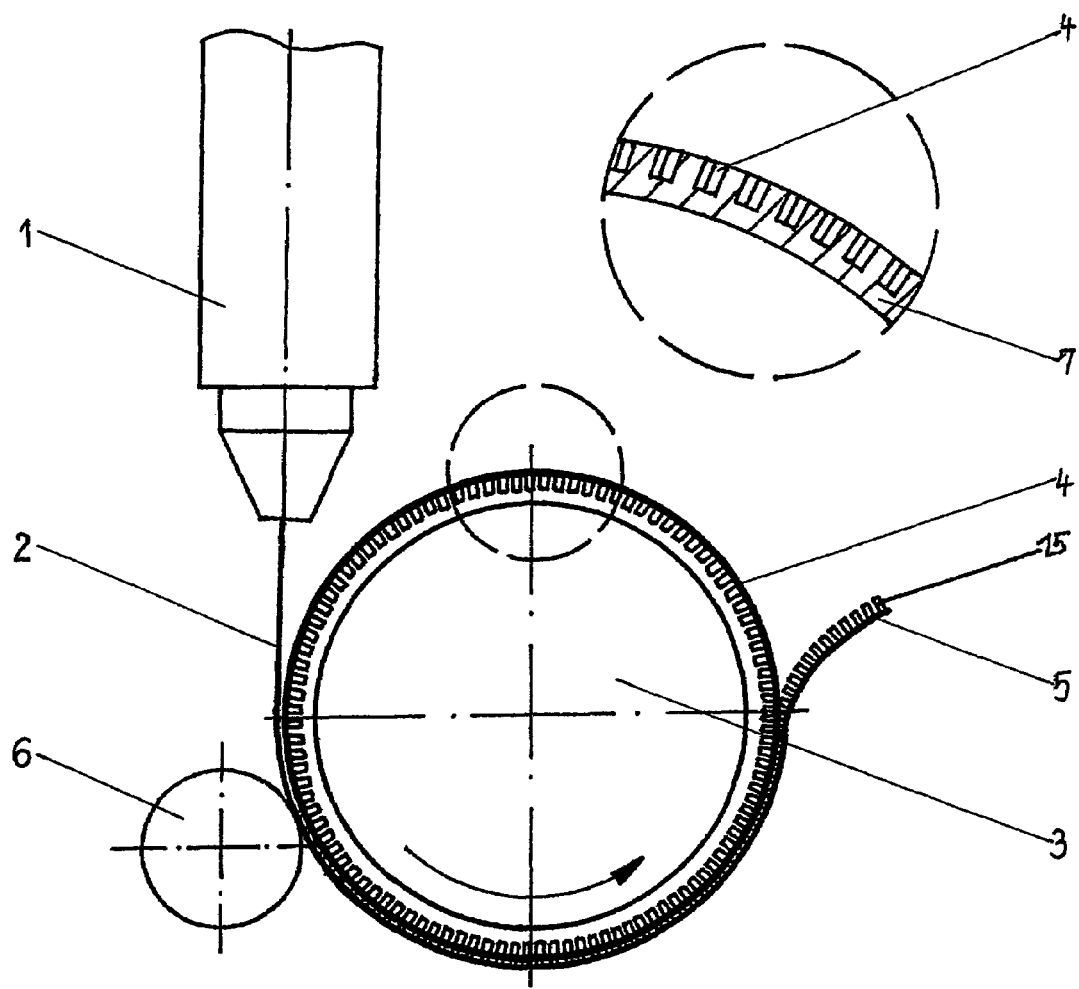
FIG. 1 is a fragmentary, cross-sectional view of an assembly for producing a pin strip according to the invention.
FIG. 1A is a fragmentary, enlarged portion of the pin strip of FIG. 1.
Figures 2, 2A:
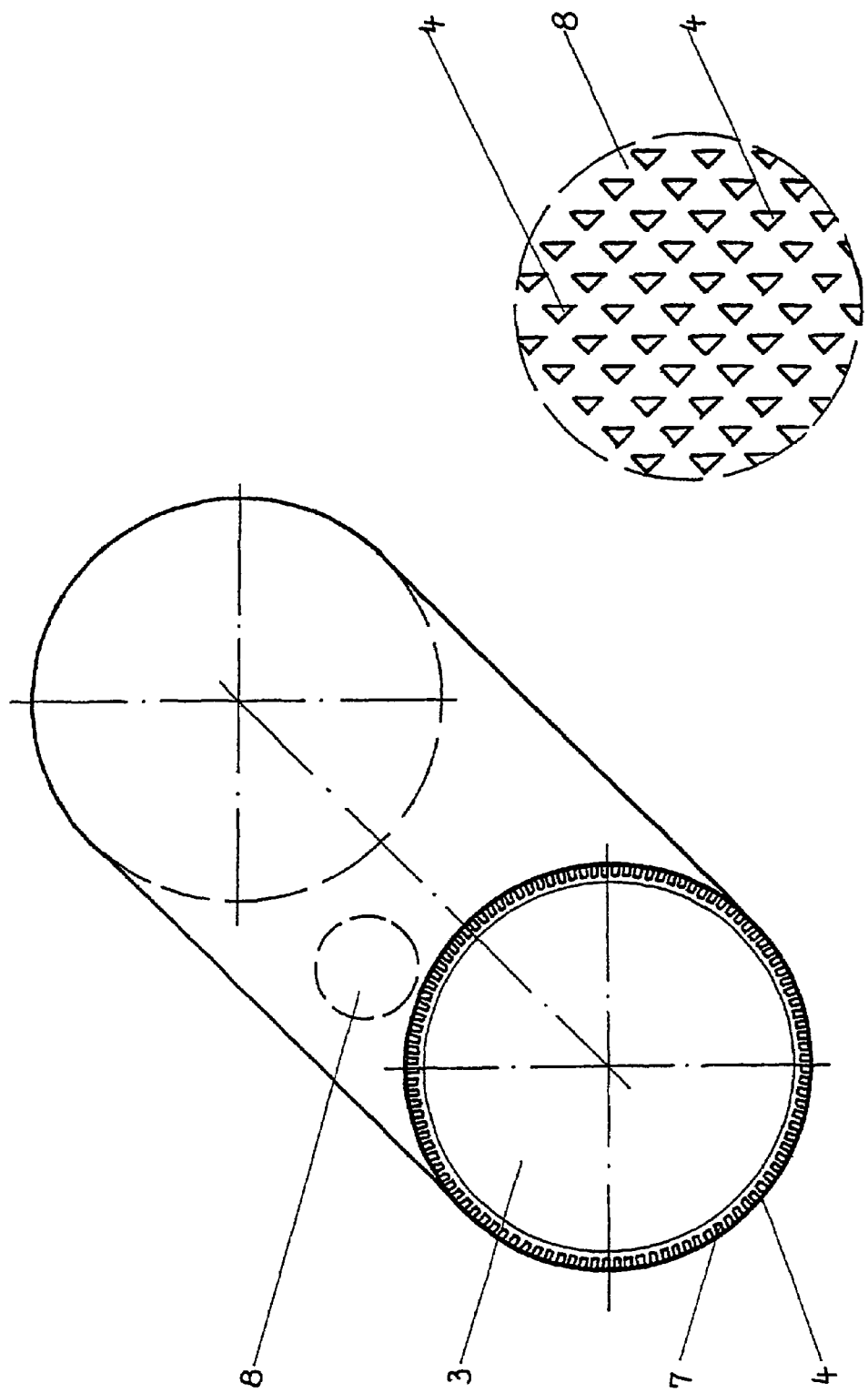
FIG. 2 is a perspective and partially hidden view of the forming roller of FIG. 1.
FIG. 2A is a fragmentary, enlarged portion of a surface of the forming roller of FIG. 2.
Figure 3:
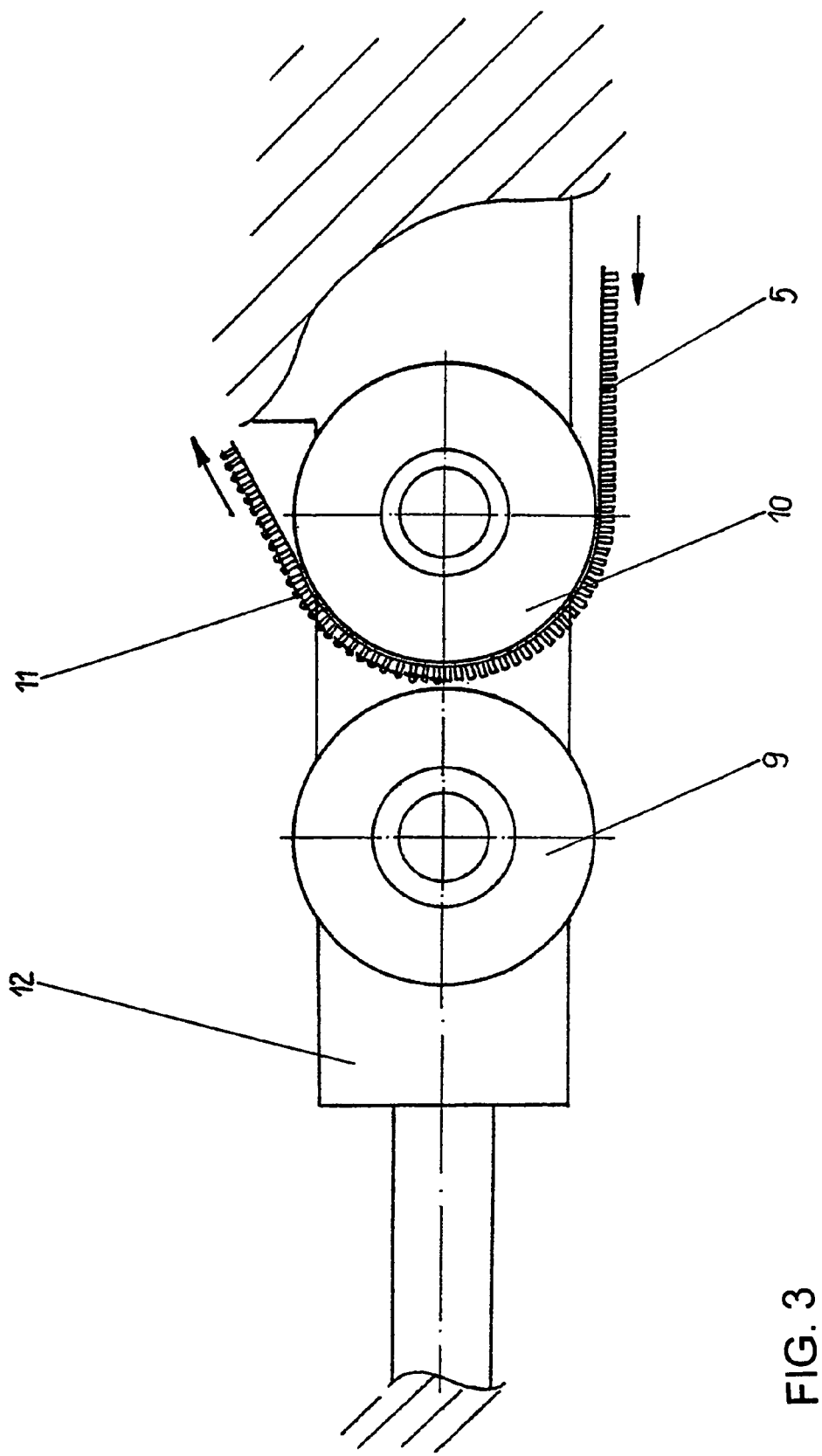
FIG. 3 is a fragmentary, cross-sectional view of an assembly for forming a head with rollers according to the invention.
Figure 4:
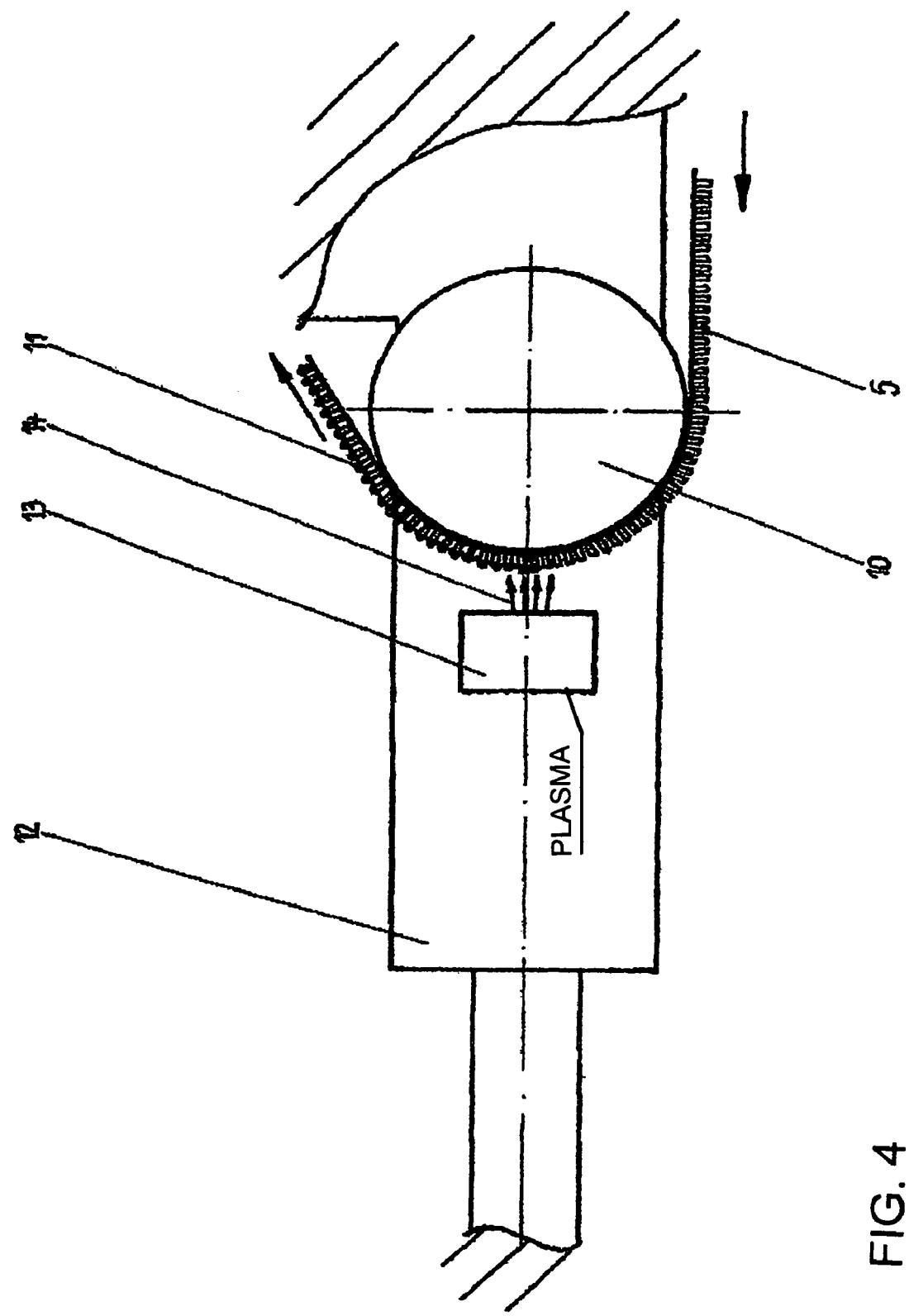
FIG. 4 is a fragmentary, cross sectional view of an assembly for plasma head formation according to the invention.

Description of the Preferred Embodiments:

Plastic granulate is fused in an extruder in the conventional way and is fed as a film strip 2 to a thermally controlled forming roller 3 via a sheet die 1. This thermally controlled forming roller 3 is equipped on its outer circumference in a form-fitting manner with a rubber layer 7. For this purpose, the thermally controlled forming roller 3 is expediently roughened for the secure reception of the rubber layer 7. The rubber layer 7, as a sheet-like strip, is provided with pin holes 4, especially evident from the detail 8 of the surface of the forming roller 3, which, however, are designed as a blind hole and therefore do not pierce through the rubber layer 7. The rubber layer 7 possesses, distributed on its circumference, laser-treated orifices as the pin holes 4, which run slightly conically downward, that is to say toward the bottom. According to FIG. 5, multiconfigured end faces of the pin holes 4 are shown by way of example, which are thus put into practice by virtue of the unlimited possibilities for the three-dimensional machining of the rubber layer 7 in terms of geometric forms, not only in width or in the narrowing of the shank, but also in their bottom configuration. Due to the possibility that the bottom of the pin holes 4 can be machined three-dimensionally in any desired way, this results in a lower outlay in economic and machining terms, for example, in the forms illustrated which in each case, in their negative form, produce the configuration of the pin head 11. Moreover, the rubber layer 7 is surface-treated, in that it is lined with a Teflon layer which likewise includes the lining of the pin holes 4. By pressure being exerted on the film strip 2 by means of a thermally controlled pressure and smoothing roller 6, said film strip is pressed against the thermally controlled forming roller 3, as a result of which the film strip 2 is pressed with its material into the pin holes 4 and the pins 15 arise on the pin strip 5. The pin strip 5 is subsequently drawn off from the thermally controlled forming roller 3 by the thermally controlled draw-off rollerer 10 and is transported further on via the latter in the conveying direction. At the same time, by means of the pressure roller 9 heated to >230° C., the pin 15 is briefly heated thermally on its surface in such a way that a forming of the pin head 11 takes place in conjunction with the pressure force of the heated pressure roller 9. Moreover, the surface of the heated pressure roller 9 is likewise equipped with a PTFE coating. In technical terms, work is carried out with the pressure roller 9 in the speed range of the pin strip 5 from about 1 m/min to about 20 m/min. Alternatively, where specific plastic materials are concerned, work is carried out in the higher speed range of the pin strip 5 from about 12 m/min to approximately 200 m/min, and, by means of the plasma arc 14 generated by a plasma device 13, the pins 15 are shock-heated on their surface and thereby fused and at the same time are deformed in their surface by the "pressure" of the plasma arc 14 in such a way that the pin head 11 is produced. Both the heated and PTFE-coated pressure roller 9 and the thermally controlled draw-off roller 10 are fixed and arranged stably on a machine stand 12.

LIST OF REFERENCE SYMBOLS USED

1 Sheet die
2 Film strip
3 Thermally controlled forming roller
4 Pin hole
5 Pin strip
6 Thermally controlled pressure and smoothing roller
7 Rubber layer
8 Detail of surface of forming roller
9 Heated PTFE-coated pressure roller
10 Thermally controlled draw-off rollerer
11 Pin head
12 Machine stand
13 Plasma device
14 Plasma arc
15 Pin

We claim:

1. A device for producing an extruded pin strip in a thermoplastic material having a strip and at least one pin protruding from the strip, the at least one pin extending from the strip to a tip and having a cross section decreasing from the strip toward the tip, the device comprising:

a sheet die for extruding a sheet of the thermoplastic material having a thickness;

a forming roller, said forming roller having an outer surface and a layer of rubber at said outer surface with at least one pinhole formed therein by laser etching, said at least one pinhole having a shape substantially complementary to a shape of the at least one pin, said at least one pinhole being a blind hole; and a pressure and smoothing roller disposed at a nip distance from said forming roller, said rollers and said sheet die causing the thermoplastic material sheet to be fed to the nip between said rollers, and said nip distance being less than said thickness of the sheet.

2. The device according to claim 1, wherein said forming roller and said pressure and smoothing roller are thermally controlled.

3. The device according to claim 1, wherein said forming roller has a metallic basic body covered by said rubber layer.

4. The device according to claim 1, wherein said at least one pin hole has an inner wall covered with Teflon.

5. The device according to claim 1, wherein said at least one pin hole is conically shaped.

* * * * *